United States Patent
Zou et al.

(10) Patent No.: US 12,168,702 B2
(45) Date of Patent: Dec. 17, 2024

(54) RADICAL POLYMERIZATION IN SEALED CONTAINERS

(71) Applicant: BAKER HUGHES OILFIELD OPERATIONS LLC, Houston, TX (US)

(72) Inventors: Jian Zou, Sugar Land, TX (US); Wojciech J. Jakubowski, Sugar Land, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 17/603,985

(22) PCT Filed: Dec. 18, 2020

(86) PCT No.: PCT/US2020/066175
§ 371 (c)(1),
(2) Date: Oct. 15, 2021

(87) PCT Pub. No.: WO2022/132178
PCT Pub. Date: Jun. 23, 2022

(65) Prior Publication Data
US 2023/0303733 A1      Sep. 28, 2023

(51) Int. Cl.
C08F 120/12      (2006.01)
C08F 2/01        (2006.01)

(52) U.S. Cl.
CPC .................. *C08F 120/12* (2013.01)

(58) Field of Classification Search
None
See application file for complete search history.

(56) References Cited

U.S. PATENT DOCUMENTS

| | | |
|---|---|---|
| 5,449,732 A | 9/1995 | Smith et al. |
| 6,475,502 B1 | 11/2002 | Lee et al. |
| 6,649,670 B1 | 11/2003 | Harris et al. |
| 6,692,156 B1 | 2/2004 | Ohura et al. |
| 7,119,132 B2 | 10/2006 | Harris et al. |
| 9,340,498 B2 | 5/2016 | Rizzardo et al. |

(Continued)

FOREIGN PATENT DOCUMENTS

| | | |
|---|---|---|
| CN | 104151462 A | 11/2014 |
| EP | 1578804 A1 | 9/2005 |

(Continued)

OTHER PUBLICATIONS

International Search Report for International Application No. PCT/US2020/066175, International Filing Date Dec. 18, 2020, Date of Mailing Sep. 13, 2021, 5 pages.

(Continued)

*Primary Examiner* — Catherine S Branch
(74) *Attorney, Agent, or Firm* — Baker Hughes Company

(57) ABSTRACT

A process of manufacturing a polymer product includes continuously forming a temporary container; introducing an unsaturated monomer component and a radical polymerization component into the temporary container; sealing the temporary container to form a sealed temporary container; and allowing the unsaturated monomer component to polymerize in the sealed temporary container to form the polymer product via a radical polymerization reaction.

14 Claims, 3 Drawing Sheets

(56) References Cited

U.S. PATENT DOCUMENTS

| | | | |
|---|---|---|---|
| 9,650,450 B2 | 5/2017 | Chiefari et al. |
| 10,442,877 B2 | 10/2019 | Herzog et al. |
| 10,626,210 B2 | 4/2020 | Hwang et al. |
| 10,814,605 B2 | 10/2020 | Sumerlin et al. |
| 10,982,017 B2 | 4/2021 | Zou et al. |
| 11,199,296 B2 | 12/2021 | Zou et al. |
| 2004/0132883 A1 | 7/2004 | Harris et al. |
| 2011/0213105 A1 | 9/2011 | Jakubowski et al. |
| 2020/0393087 A1 | 12/2020 | Zou et al. |
| 2022/0195098 A1 | 6/2022 | Zou et al. |

FOREIGN PATENT DOCUMENTS

| | | | | |
|---|---|---|---|---|
| WO | 2008009997 A1 | 1/2008 | | |
| WO | WO-2017134652 A1 * | 8/2017 | .......... | C10M 145/14 |

OTHER PUBLICATIONS

Written Opinion for International Application No. PCT/US2020/066175, International Filing Date Dec. 18, 2020, Date of Mailing Sep. 13, 2021, 4 pages.

* cited by examiner

RADICAL POLYMERIZATION IN SEALED CONTAINERS

CROSS REFERENCE TO RELATED APPLICATIONS

This application is a National Stage application of PCT/US2020/066175, filed Dec. 18, 2020, which is incorporated by reference in their entirety herein.

BACKGROUND

Radical polymerization has been widely used to manufacture a variety of polymers such as polyethylene, polystyrene, polyvinyl chloride, styrene butadiene rubber, and nitrile rubber. Free-radical polymerization is the most common radical polymerization technique and is used to manufacture more than half of all polymers produced worldwide. Recently, controlled radical polymerization (CRP) has gained attention. Compared to the traditional free-radical polymerization, CRP techniques such as nitroxide mediated polymerization (NMP), atom transfer radical polymerization (ATRP), and reversible addition fragmentation chain transfer polymerization (RAFT) can have better control of molecular weight, molecular weight distribution, and polymer structure.

There are generally four industrial radical polymerization processes: bulk polymerization, solution polymerization, suspension polymerization, and emulsion polymerization. Bulk polymerization is carried out in the absence of any solvent and can produce high molecular weight polymers with high conversion and minimum contamination in a relatively short period of time. However, without any solvent to dissipate the heat generated during polymerization, reactors for bulk polymerization have to be equipped with mechanical agitators or other powerful mixing equipment, and the operators often need to take many safety precautions in order to prevent uncontrolled polymerization.

Solution polymerization, suspension polymerization, and emulsion polymerization partially solve the issues of heat transfer by introducing solvents and surfactants. However the polymers made by these processes typically have a lower polymer concentration as compared to polymers made by bulk polymerization. In addition, solvents and surfactants may be difficult to remove. Moreover, industrial scale production can still require specifically designed equipment to safely handle exothermic effects and efficiently control the reaction temperature.

Accordingly, there is a need in the art for alternative processes to effectively, efficiently, and safely manufacture polymers via radical polymerization.

BRIEF DESCRIPTION

A process of manufacturing a polymer product includes continuously forming a temporary container; introducing an unsaturated monomer component and a radical polymerization component into the temporary container; sealing the temporary container to form a sealed temporary container; and allowing the unsaturated monomer component to polymerize in the sealed temporary container to form the polymer product via a radical polymerization reaction.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
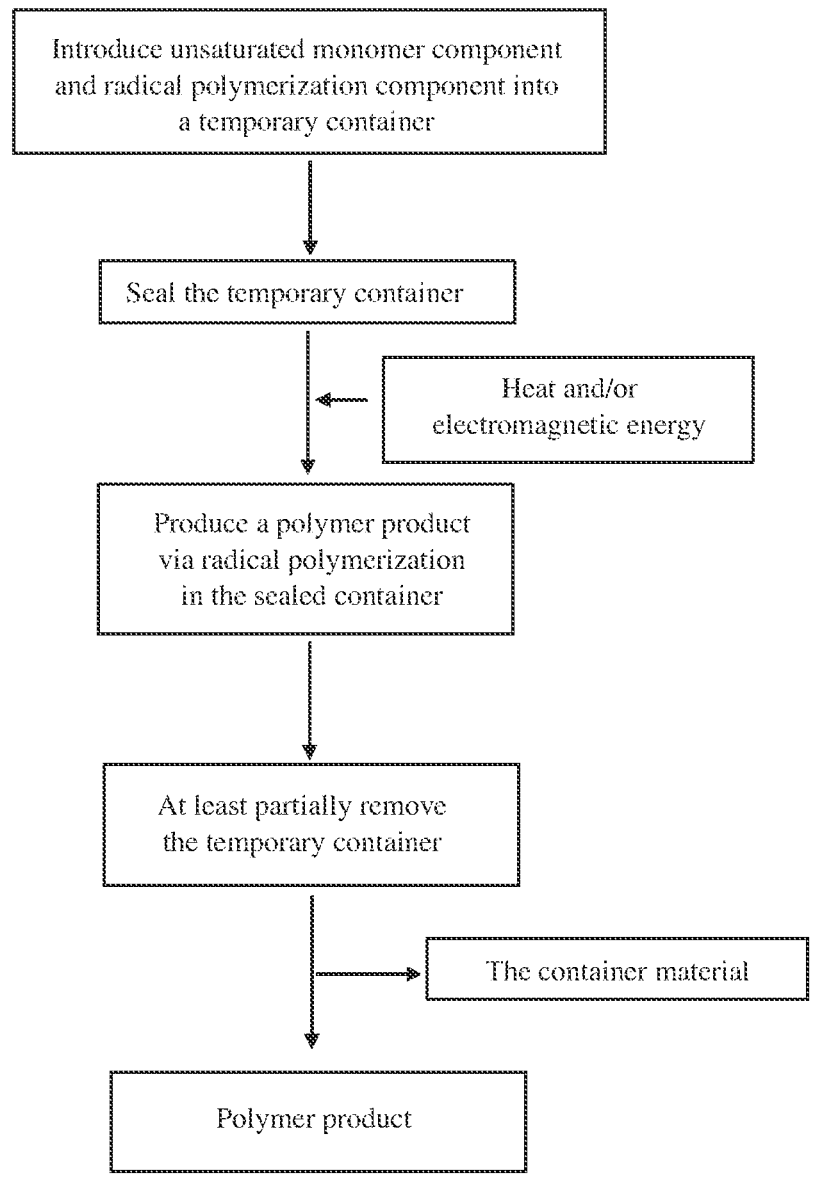
FIG. 1 is a process diagram showing an exemplary process of making a polymer product via radical polymerization in a sealed temporary container, wherein the temporary container is at least partially removed after polymerization.
Figure 2:
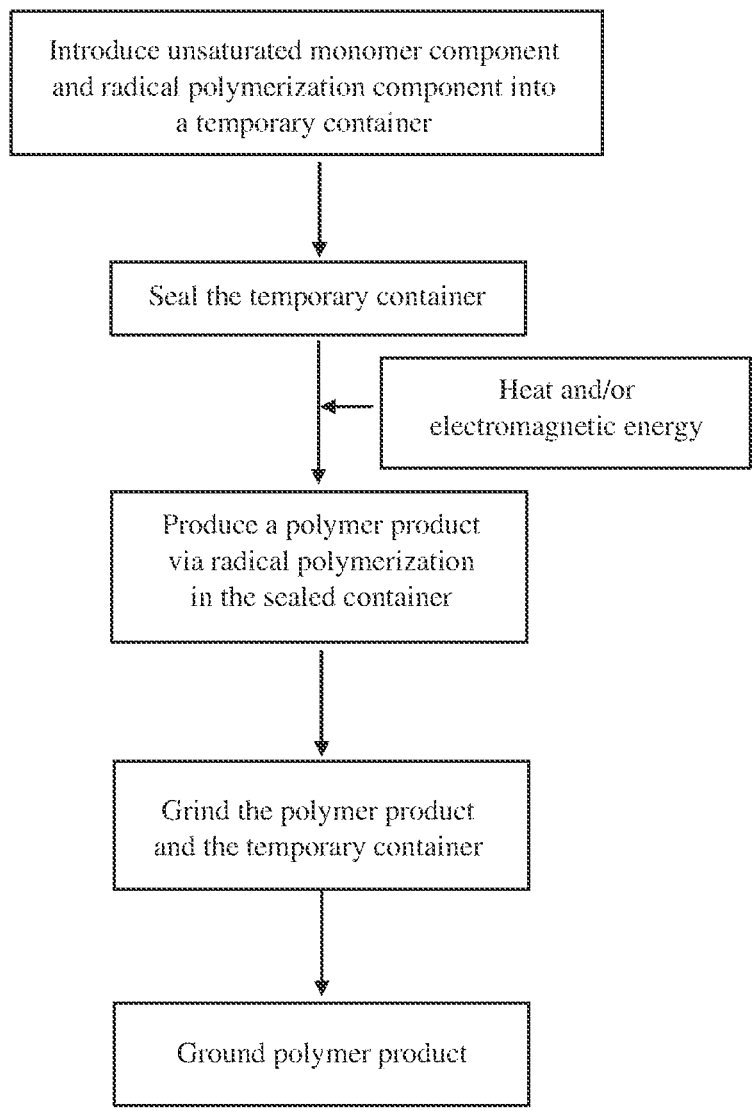
FIG. 2 is a process diagram showing another exemplary process of making a polymer product via radical polymerization in a sealed temporary container, where both the polymer and the temporary container are ground before further processed or used.
Figure 3:
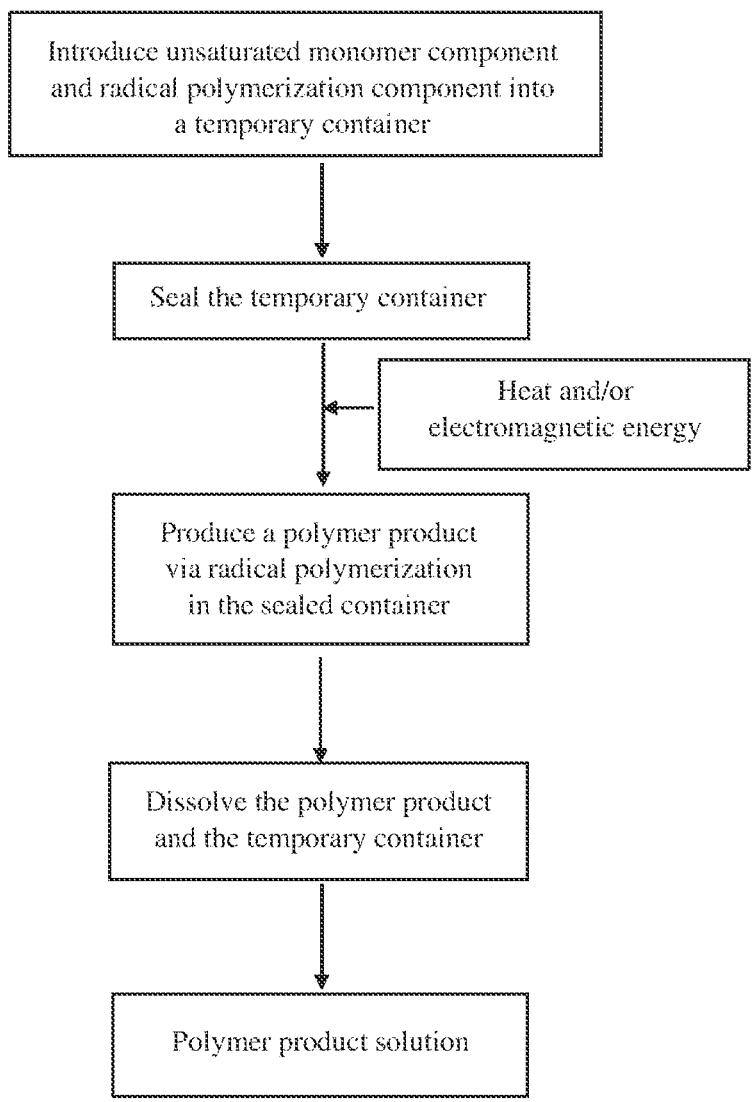
FIG. 3 is a process diagram showing yet another exemplary process of making a polymer product via radical polymerization in a sealed temporary container where both the polymer and the temporary container are dissolved in a solvent before further processed or used.

The inventors have discovered a process that uses a sealed temporary container as a reaction vessel to make polymer products via a radical polymerization reaction. The process can effectively and efficiently transfer heat outside of the container without using any mechanical agitators.

The temporary container can be an excellent barrier for oxygen, moisture, and outside liquid or gas. Thus the temporary container may not need to be placed in an inert atmosphere during the polymerization reaction.

When no longer needed, the temporary container can be removed or ground/dissolved together with the polymer product, avoiding the cost associated with building, using, or cleaning conventional reactors.

The temporary container can be continuously made from a container material. Suitable container materials are those that can form a film. Examples of container materials include but are not limited to, a polyethylene, a polypropylene, an ethylene propylene copolymer, a polystyrene, a polylactic acid, a polyamide, a polyester, a polystyrene, an ethylene vinyl acetate copolymer, an ethylene vinyl alcohol copolymer, a polyvinylpyrrolidone, an ethylene vinylpyrrolidone copolymer, a vinylpyrrolidone vinyl acetate copolymer, a polyvinyl acetate, a polyvinyl alcohol, a polyethylene oxide, a polyethylene glycol, polyvinylidene chloride, a polysaccharide or its derivative, or a combination comprising at least one of the foregoing. Examples of polysaccharide and polysaccharide derivative include chitin, chitosan, chemically modified cellulose, and a chemically modified starch. As used herein, chemically modified cellulose and chemically modified starch refer to cellulose or starch which have been chemically treated such that the modified material is dissolvable in water and/or a polar solvent and can form a film. Examples of chemically modified starch include starch acetate. Examples of chemically modified cellulose include cellulose acetate and cellulose triacetate. More than one container materials can be used.

The temporary container can have a single layered structure or a multi-layered structure. A single layer structure means that the temporary container has only one layer, and that layer is made from the container material as disclosed herein. A multi-layered structure means that the temporary container has two or more layers, wherein at least one layer is made from the container material as disclosed herein. Without wishing to be bound by theory, it is believed that when the temporary container is constructed with multiple layers of different materials, its oxygen and/or moisture barrier performance, mechanic strength, and sealing properties can be further improved, and dissolution of the container material can be fine-tuned.

In a continuous process, the container materials can be provided as a continuous sheet, which is sealed by heat or adhesive after the unsaturated monomers and the radical polymerization components are introduced. Co-extrusion, lamination, or other methods known in the art can be used to produce temporary containers having a multi-layered structure. In a temporary container having a multi-layered structure, the layer that faces the polymer products or the reaction mixtures used to form the polymer products is referred to as an inner layer, and the layer defines the exterior of the temporary container is referred to as an outer layer. The layer that includes the container material as disclosed herein can be an inner layer or an outer layer of the temporary container. In an embodiment, each layer of the multi-layer structure independently comprises a container material as disclosed herein. Between different layers, it may or may not require an adhesive layer.

Optionally the temporary container can be coated with wax, a silicone, phenolic resin, or a combination comprising at least one of the foregoing. The wax can be a natural wax or a synthetic wax. Examples of suitable naturally occurring wax materials include beeswax, candelilla wax, carnauba wax, ozokerite wax, ceresin wax, montan wax. Synthetic waxes include paraffin waxes, and polymers under the tradenames VYBAR™ and POLYWAX™. As used herein, silicone includes silicone oils. In an embodiment, the silicone in the coating is polydimethylsiloxane (PDMS). Phenolic resins include polymers obtained by the reaction of phenol or substituted phenol with formaldehyde.

The coating can be disposed on an inner surface of the container, an outer surface of the container, or both the inner surface and the outer surface of the container. As used herein, an inner surface of the container means the surface that would otherwise be in direct physical contact with the polymer products, or the reaction mixtures to produce the polymer products when the coating is not present. The outer surface refers to a surface that is opposed to the inner surface. The coating material can be sprayed onto the inner and/or outer surfaces of the temporary container in situ during a continuous process.

The coating can reduce the tendency of the container sticking to the manufacturing equipment, especially during the heat sealing step to seal the container. The coating can further tune the barrier performance of the temporary container.

The temporary containers may have different shapes such as sphere, cylinder, rectangular cube, cube, or irregular shapes. The temporary contains can have a volume of about 1 milliliter to about 10 liters, preferably between about 1 milliliter and about 5 liters, and more preferably between about 10 milliliters and about 1 liter. In another aspect, the containers have a weight capacity of about 1 gram to about 25,000 grams, preferably about 10 grams to about 2,500 grams. The temporary container can have a wall thickness of about 1 to about 2,000 microns, preferably about 10 to about 100 microns. Because of the relatively small size of these temporary containers compared to the size of industrial polymerization reactors, these temporary containers have a much larger surface-to-volume ratio than industrial polymerization reactors do, therefore, have much better heat transfer and much easier temperature control during the polymerization process. The small size of temporary containers also allows the light to penetrate them more efficiently than industrial polymerization reactors. This is important when electromagnetic energy is used to initiate and or control radical polymerization process.

After the temporary containers are formed, unsaturated monomer components and radical polymerization components can be introduced into the temporary containers. The unsaturated monomer components in the temporary containers are not particularly limited and can include any unsaturated monomers that may be polymerized via a radical polymerization reaction. Preferably the unsaturated monomers are ethylenically unsaturated monomers. The term "ethylenically unsaturated" is used to describe compounds having carbon-carbon double bonds therein. The unsaturated monomers can be used alone or in combination. Optionally the unsaturated component can also include oligomers derived from the unsaturated monomers. The oligomers can have a weight average molecular weight of less than about 5,000 Daltons or less than about 3,000 Daltons as determined by a gel permeation chromatography (GPC) method.

The unsaturated monomers can be aliphatic or aromatic. The unsaturated monomers can optionally include heteroatoms, functional groups, or a combination thereof. Unsaturated monomers can have a structure represented by formula (1) $CH_2=C(R1)C(O)OR2$ (1) where R1 is an alkyl group with 1 to 10 carbon atoms or H, R2 is H, a C1-C40 alkyl group, a C5-C30 substituted or unsubstituted cycloalkyl group, a C6-C20 substituted or unsubstituted aryl group, or an aryl-substituted C1-C10 alkyl group. Unsaturated monomers can also have a structure represented by Formula (2) $CH_2=C(H)R$ (2) where R is a substituted or unsubstituted alkyl group with 1 to 40 carbon atoms.

Examples of unsaturated monomers include but are not limited to, acrylic acid; methacrylic acid; ethacrylic acid; methyl acrylate; ethyl acrylate; n-butyl acrylate; iso-butyl acrylate; t-butyl acrylate; 2-ethylhexyl acrylate; decyl acrylate; octyl acrylate; cyclohexyl acrylate; dodecyl acrylate; heptyl acrylate; methyl methacrylate; ethyl methacrylate; n-butyl methacrylate; iso-butyl methacrylate; t-butyl methacrylate; 2-ethylhexyl methacrylate; decyl methacrylate; methyl ethacrylate; ethyl ethacrylate; n-butyl ethacrylate; iso-butyl ethacrylate; t-butyl ethacrylate; 2-ethylhexyl ethacrylate; decyl ethacrylate; 2,3-dihydroxypropyl acrylate; 2,3-dihydroxypropyl methacrylate; ethylene glycol methacrylate; 2-hydroxyethyl acrylate; 2-hydroxypropyl acrylate; hydroxypropyl methacrylate; glyceryl monoacrylate; glyceryl monoethacrylate; glycidyl methacrylate; glycidyl acrylate; benzyl acrylate; 4-butoxycarbonylphenyl acrylate; 4-cyanobutyl acrylate; 3-methoxybutyl acrylate; 3-methoxypropyl acrylate; diethyleneglycolethyl acrylate; PEG-methacrylate; 2-(dimethylamino)ethyl methacrylate; 2-(trimethylamino)ethyl methacrylate; acrylamide; methacrylamide; ethacrylamide; N-methyl acrylamide; N,N-dimethyl acrylamide; N,N-dimethyl methacrylamide; N-ethyl acrylamide; N-isopropyl acrylamide; N-butyl acrylamide; N-t-butyl acrylamide; N,N-di-n-butyl acrylamide; N,N-diethylacrylamide; N-octyl acrylamide; N-octadecyl acrylamide; N-phenyl acrylamide; N-methyl methacrylamide; N-ethyl methacrylamide; N-dodecyl methacrylamide; N,N-dimethylaminoethyl acrylamide; quaternised N,N-dimethylaminoethyl acrylamide; N,N-dimethylaminoethyl methacrylamide; quaternised N,N-dimethylaminoethyl methacrylamide; N-isopropylacrylamide; N,N-dimethylaminoethyl acrylate; N,N-dimethylaminoethyl methacrylate; quaternised N,N-dimethylaminoethyl methacrylate; quaternised N,N-dimethyl-aminoethyl acrylate; 2-hydroxyethyl methacrylate; 2-hydroxyethyl ethacrylate; N,N-dihydroxyethylacrylamide, glyceryl acrylate; 2-methoxyethyl acrylate; 2-methoxyethyl methacrylate; 2-methoxyethyl ethacrylate; 2-ethoxyethyl acrylate; 2-ethoxyethyl methacrylate; 2-ethoxyethyl ethacrylate; maleic acid; maleic anhydride and its half esters; fumaric acid; itaconic acid; itaconic anhydride and its half esters; crotonic acid; angelic acid; diallyldimethyl ammonium chloride; vinyl pyrrolidone; vinyl imidazole; methyl vinyl ether; methyl vinyl ketone; maleimide; vinyl pyridine; vinyl pyridine-N-oxide; vinyl furan; styrene optionally substituted with one or more C1-C12 straight or branched chain alkyl groups, such as alpha-methylstyrene, t-butylstyrene, and p-methylstyrene; styrene sulfonic acid and its salts; allyl alcohol; allyl citrate; allyl tartrate; vinyl acetate; vinyl alcohol; vinyl caprolactam; vinyl acetamide; vinyl formamide; acrylonitrile; 2-acrylamido-2-methylpropane sulphonic acid; poly(ethylene glycol) methyl ether methacrylate (PEGMA); poly(ethylene glycol) methyl ether acrylate (PEGA); poly(ethylene glycol) methacrylate; poly(ethylene glycol) acrylate; poly(propylene glycol) methyl ether methacrylate (PPGMA); poly(propylene glycol) methyl ether acrylate (PPGA); poly(propylene glycol) methacrylate; poly(propylene glycol) acrylate; 4-hydroxybutyl acrylate; N-hydroxyethyl acrylamide; N-hydroxymethyl acrylamide; N-isopropylacrylamide; N-methylacrylamide; N-ethylacrylamide; N-propylacrylamide; methacrylamide; N-tert-butylacrylamide; N-[3-(dimethylamino)propyl]methacrylamide; N-[3-(dimethylamino)propyl]acrylamide, 2-(dimethylamino)ethyl acrylate; 2-(dimethylamino)ethyl methacrylate; 3-(dimethylamino)propyl acrylate; 3-(dimethylamino)propyl methacrylate; 2-(diethylamino)ethyl acrylate; (3-acrylamidopropyl)trimethylammonium chloride (APTAC); [2-(acryloyloxy)ethyl]trimethylammonium chloride (AETAC); [2-(methacryloyloxy)ethyl] trimethylammonium chloride (MAETAC); [3-(methacryloylamino)propyl]trimethylammonium chloride (MAPTAC); 2-acrylamido-2-methylpropane sulfonic acid; [2-(methacryloyloxy)ethyl]dimethyl-(3-sulfopropyl)ammonium hydroxide; [3-(methacryloylamino)propyl]dimethyl (3-sulfopropyl)ammonium hydroxide; styrenesulfonic acid; diallyldimethyl ammonium chloride (DADMAC); acryloyloxyethyldimethylbenzyl ammonium chloride (AEDBAC); methacryloyloxyethyldimethylbenzyl ammonium chloride (MEDBAC); vinyl chloride; 1,3-butadiene; 2-methyl-1,3-butadiene; 2-chlorobutadiene; cyanobutadiene; 2-propenenitrile; and isobutylene.

Radical polymerization can be carried out in the sealed temporary containers. The radical polymerization can be a free-radical polymerization or a controlled radical polymerization (CRP). CRP can include atom transfer radical polymerization (ATRP), reversible addition/fragmentation chain transfer polymerization (RAFT), nitroxide-mediated polymerization (NMP), or other known controlled radical polymerization techniques.

When the radical polymerization reaction is a free-radical polymerization reaction, the radical polymerization components in the temporary containers can comprise a free-radical initiator and an optional component, where the optional component comprises a solvent, a chain transfer agent, or a combination comprising at least one of the foregoing.

Free-radical initiators can be used to initiate the free-radical polymerization. Free-radical initiators include compounds that decompose to generate radicals with moderate heating such as organic peroxides and azo compounds, redox initiators that generate radicals by the combinations of oxidizing agents and reducing agents, and photochemical initiators that decompose or cleave into radicals with lights. Examples of initiators include but are not limited to 2,2'-azobis(2-methylpropionitrile) (AIBN); a peroxide, for example, benzoyl peroxide (BPO), lauroyl peroxide, or cyclohexanone peroxide; a peroxy acid, for example, peroxyacetic acid or peroxybenzoic acid; tert butyl peracetate; 1,1-bis(tert-butylperoxy)-3,3,5-(dibutylphthalate)trimethylcyclohexane: 2,2'-azobis(4-methoxy-2,4-dimethyl Valeronitrile) (V-70): 2,2'-azobis(2.4-dimethyl valeronitrile) (V-65); dimethyl 2,2'-azobis(2-methylpropionate) (V-601): 2,2'-azo-bis(2-methylbutyronitrile) (V-59); 1,1'-azo bis(cyclohexane-1-carbonitrile) (V-40): 2,2'-azobisN-(2-propenyl)-2-methylpropionamide (VF-096); 4,4'-azobis(4-cyanovaleric acid) (ACVA), an Irgacure™ initiator (e.g., Irgacure™ 2959), 2-hydroxy-4'-(2-hydroxyethoxy)-2-methylpropiophenone, 2,2'-azobis[2-(2-imidazolin-2-yl)propane]disulfate dihydrate (VA-046B), 2,2'-azobis(2-methylpropionamidine)dihydrochloride (V-50), 2,2'-azobis[2-(2-imidazolin-2-yl)propane]dihydrochloride (VA-044), 2,2-dimethoxy-2-phenylacetophenone (DMPA), a photoiniferters, for example, thiocarbonylthio, trithiocarbonates, disulfides, tetraethylthiuram disulfide (TTDS), dibenzoyl disulfide (DBDS), S-benzyl N,N-diethyldithiocarbamate (BDT), p-xylylene bis(N,N-diethyldithiocarbamate) (XDT); a photoinitiators, for example benzoins, e.g., benzoin, benzoin ethers such as benzoin methyl ether, benzoin ethyl ether, benzoin isopropyl ether, benzoin phenyl ether, and benzoin acetate; acetophenones, e.g., acetophenone, 2,2-dimethoxyacetophenone, 2,2-dimethoxy-2-phenylacetophenone and 1,1-dichloroacetophenone; benzyl ketals, e.g., benzyl dimethylketal and benzyl diethyl ketal; anthraquinones, e.g., 2-methylanthraquinone, 2-ethylanthraquinone, 2-tertbutylanthraquinone, 1-chloroanthraquinone and 2-amylanthraquinone; triphenylphosphine; benzoylphosphine oxides, e.g., 2,4,6-trimethylbenzoyl-diphenylphosphine oxide; ethyl-2,4,6-trimethylbenzoylphenylphosphinate; bisacylphosphine oxides; benzophenones, e.g., benzophenone and 4,4'-bis(N,N'-dimethylamino)benzophenone; thioxanthones and xanthones; acridine derivatives; phenazine derivatives; quinoxaline derivatives; 1-phenyl-1,2-propanedione 2-O-benzoyl oxime; 4-(2-hydroxyethoxy)phenyl-(2-propyl)ketone; 2-methyl-1-[4-(methylthio)phenyl]-2-(4-morpholinyl)-1-propanone; 1-aminophenyl ketones or 1-hydroxy phenyl ketones, e.g., 1-hydroxycyclohexyl phenyl ketone, 2-hydroxyisopropyl phenyl ketone, phenyl 1-hydroxyisopropyl ketone, and 4-isopropylphenyl 1-hydroxyisopropyl ketone, or derivatives or combinations thereof.

Regents used in ATRP are known and have been described, for example, in US 2011/0213105. During an ATRP process, unsaturated monomer components are polymerized in the presence of an ATRP initiator, optionally a metal catalyst, optionally a ligand, optionally a photocatalyst, optionally a reducing agent, and optionally a solvent. Accordingly, when the radical polymerization reaction is an ATRP reaction, the radical polymerization component charged into the temporary container can comprise an ATRP initiator and an optional component which includes a metal catalyst, a ligand, a photocatalyst, a reducing agent, a solvent, or a combination comprising at least one of the foregoing.

The term "ATRP initiator" is understood to mean a molecule comprising one or more transferable atoms or groups, wherein the initiator is capable of decomposing to provide an activated species capable of reacting with unsaturated monomers to form polymeric components. For example, the initiator may be an alkyl-containing molecule comprising one or more transferable atoms or groups, such as a halide-substituted alkyl initiator, wherein the halide is the transferable atom or group.

Suitable ATRP initiators may include, but are not limited to, alkyl halides or substituted alkyl halides, such as diethyl 2-bromo-2-methylmalonate (DEBMM); ethyl 2-bromoisobutyrate (EBiB); methyl 2-bromopropionate (MBP); ethyl 2-chloroisobutyrate (ECiB); 1,2-bis(2-bromoisobutyryloxy)ethane (2f-BiB); ethyl α-bromophenylacetate (EBPA); methyl α-bromoisobutyrate (MBIB); ethyl α-bromoisobutyrate (EBIB); a low molecular weight initiator comprising one or more transferable atoms or groups, such as a substituted alkyl halide attached to a low molecular weight molecule, or a substituted alkyl halide attached to a low molecular weight molecule having an additional non-initiating functionality; a macroinitiator having one or more transferable atoms or groups, such as a polymeric component comprising an alkyl halide moiety, for example, a polystyrene block having a halide at a terminal end; a solid inorganic material with tethered initiating groups; or an organic material with tethered initiating groups. Other suitable ATRP initiators can be found in US 2011/0213105.

Suitable metal catalysts that may be useful in ATRP processes may include metals such as transition metals, like $Cu^0$, that may convert to an oxided metal in situ and/or those represented by Formula (3): $M_t^{+n}X'_n$ (3), wherein $M_t^{+n}$ may comprise $Cu^{+1}$; $Cu^{+2}$; $Fe^{+2}$; $Fe^{+3}$; $Ru^{+2}$; $Ru^{+3}$; $Cr^{+2}$; $Cr^{+3}$; $Mo^{+2}$; $Mo^{+3}$; $W^{+2}$; $W^{+3}$; $Mn^{+3}$; $Mn^{+4}$; $Rh^{+3}$; $Rh^{+4}$; $Re^{+2}$; $Re^{+3}$; $Co^{+1}$; $Co^{+2}$; $V^{+2}$; $V^{+3}$; $Zn^{+1}$; $Zn^{+2}$; $Au^{+1}$; $Au^{+2}$; $Ag^{+1}$; and $Ag^{+2}$; wherein X' may comprise halogen; C1-C6-alkoxy; $(SO_4)_{1/2}$; $(PO_4)_{1/3}$; $(R^1PO_4)_{1/2}$; $(R^1{}_2PO_4)$; triflate; hexafluorophosphate; methanesulfonate; arylsulfonate; CN; and $R^2CO_2$; wherein $R^1$ may comprise aryl or a straight or branched C1-C20 alkyl group, such as C1-C10 alkyl group, or where two $R^1$ groups may be joined to form a 5-, 6-, or 7-membered heterocyclic ring; wherein $R^2$ may comprise hydrogen or a straight or branched C1-C6 alkyl group which may be substituted from 1 to 5 times with a halogen; and wherein n is the formal charge on the metal, and has a value between 0 and 7.

Suitable ligands that may be useful in ATRP processes include those that may be capable of forming a complex with an active metal-halide catalyst may include, but are not limited to, tris(2-pyridylmethyl)amine (TPMA); tris[2-(dimethylamino)ethyl]amine (Me6TREN); N,N,N',N",N"-pentamethyldiethyletriamine (PMDETA); N,N,M,N',N",N'"-hexamethyltriethylenetetramine (HMTETA); 4,4'-dinonyl bipyridine (dNbipy); or bipyridine (bipy). Additional ligands are described in US 2011/0213105.

Reducing agent may be used in an ATRP process. "Reducing agent" is understood to mean any reducing agent capable of reducing the transition metal catalyst from a higher oxidation state to a lower oxidation state, thereby reforming the catalyst activator state. For example, the reducing agent may be free-radical initiator. The reducing agent may initiate and/or perpetuate a polymerization reaction, such as an ATRP polymerization reaction, by generating or regenerating the active metal catalyst from the inactive metal catalyst. Such reducing agents include, but are not limited to, $SO_2$, sulfites, bisulfites, thiosulfites, mercaptans, hydroxylamines, hydrazine ($N_2H_4$), phenylhydrazine ($PhNHNH_2$), hydrazones, hydroquinone, food preservatives, flavonoids, beta carotene, vitamin A, .alpha.-tocopherols, vitamin E, propyl gallate, octyl gallate, BHA, BHT, propionic acids, ascorbic acid, sorbates, reducing sugars, sugars comprising an aldehyde group glucose, lactose, fructose, dextrose, potassium tartrate, nitrites, nitrites, dextrin, aldehydes, glycine, and transition metal salts.

Photocatalyst may be used in an ATRP process. "Photocatalyst" is understood to mean any organic compound which under photoexcitation using electromagnetic energy will activate ATRP initiator (e.g. alkyl halide) to carbon-centered radical, which can than react with monomer. Suitable photocatalysts may include, but are not limited to phenothiazines, dihydrophenazines, phenoxazines, perylene, pyrene, thienothiophenes, 10-phenylphenothiazine (Ph-PTH), fluorescein, benzo[b]-phenothiazine (Ph-benzoPTZ), 1,2,3,5-tetrakis(carbazol-9-yl)-4,6-dicyanobenzene (4CzIPN), 4-[2-(4-diphenylaminophenyl)thieno[3,2-b]thiophen-3-yl]benzonitrile (TT-TPA), Eosin Y, 3,7-di(2-naphthyl)-2-naphthalene-10-phenoxazine (Dinapht-PhenO) and certain dye/amine combinations.

Controlled polymerization by RAFT occurs via rapid chain transfer between growing polymer radicals and dormant polymer chains. After initiation, the control agent becomes part of the dormant polymer chain. When the radical polymerization reaction is a RAFT reaction, the radical polymerization component can comprise a RAFT initiator, a RAFT agent, and optionally a solvent.

The RAFT initiator can be a free-radical initiator. In some cases, the RAFT initiator may comprise a photoinitiator, a thermal initiator, and/or a redox initiator. In certain embodiments, the initiator is an azo initiator. Non-limiting examples of suitable initiators include azobisisobutyronitrile (AIBN), 4,4'-azobis(4-cyanovaleric acid) (ACVA), an Irgacure™ initiator (e.g., Irgacure™ 2959), 2-hydroxy-4'-(2-hydroxyethoxy)-2-methylpropiophenone, 2,2'-azobis[2-(2-imidazolin-2-yl)propane]disulfate dihydrate (VA-046B), 2,2'-azobis[2-(2-imidazolin-2-yl)propane]dihydrochloride (VA-044), and 2,2-dimethoxy-2-phenyl-acetophenone (DMPA).

RAFT agents can be used and may contain thiocarbonylthio groups, and include, for example, dithioesters, dithiocarbamates, trithiocarbonates and xanthenes. Examples of useful RAFT agents include those described in "The Chemistry of Radical Polymerization", Graeme Moad & David H. Solomon, $2^{nd}$ rev. ed., 2006, Elsevier, p. 508-514.

Additional RAFT reagents and process conditions are also known and have been described, for example, in U.S. Pat. Nos. 9,650,450, 10,442,877, 9,340,498, 10,814,605, and 10,626,210.

NMP achieves control with dynamic equilibrium between dormant alkoxyamines and actively propagating radicals. When the radical polymerization reaction is an NMP reaction, the radical polymerization component introduced into the temporary container can comprise a nitroxide, an NMP initiator, and optionally a solvent.

Many different types of nitroxides have been described and there are many methods for producing nitroxides in-situ. Examples of useful NMP initiators include those described in "The Chemistry of Radical Polymerization", Graeme Moad & David H. Solomon, 2nd rev. ed., 2006, Elsevier, p. 473-475. An example of a commercially available NMP initiator is BlocBuilder™, an alkoxyamine compound, available from Arkema. Additional materials and reaction conditions have been described, for example, in U.S. Pat. No. 6,692,156 and Chemical Reviews 2001, 101, 3661-3688.

Chain transfer agents can be added during radical polymerization to control the chain length of the polymer product. Chain transfer agents can include halogen compounds, aromatic hydrocarbons, and thiols (mercaptans). Examples of chain transfer agents include 4,4'-thiobisbenzenethiol, tert-nonyl mercaptan, pentaphenylethane, isooctyl 3-mercaptopropionate, 4-methylbenzenethiol, bromotrichloromethane, carbon tetrabromide, and carbon tetrachloride. Suitable chain transfer agents are described in detail, for example, by K. C. Berger and G. Brandrup in J. Brandrup, E. H. Immergut, Polymer Handbook, 3rd edition, John Wiley & Sons, New York, 1989, pp. II/81-II/141.

The optional solvents for the radical polymerization reaction can be polar solvents, nonpolar solvents, or a combination comprising at least one of the foregoing. Examples of polar solvents include water, methanol, propanol, hexanol, octanol, hexylene glycol, dichloromethane (DCM), tetrahydrofuran (THF), ethyl acetate, acetone, dimethylformamide (DMF), acetonitrile (MeCN), dimethyl sulfoxide (DMSO), nitromethane, propylene carbonate, or a combination comprising at least one of the foregoing. Examples of nonpolar solvents include hexane, toluene, xylene, gasoline, diesel, crude oil, oil from plants such as palm oil and vegetable oil, or a combination comprising at least one of the foregoing. The solvents, if used, are selected such that they do not dissolve the specific container material used for a particular radical polymerization reaction.

The unsaturated monomer components and the radical polymerization components can be premixed before being introduced into the temporary containers. In an embodiment, the unsaturated monomer components and the radical polymerization components are charged into at least one or a series of continuous stirred tank reactors or a static mixer, where the monomers are allowed to at least partially react forming oligomers having a desired molecular weight or viscosity before being introduced into the temporary containers. Alternatively the individual compounds in the unsaturated monomer components and the radical polymerization components can be separately added into the temporary containers.

Once charged with the unsaturated monomer components and the radical polymerization components, the temporary containers are sealed. A "form, fill, and seal" packaging device can be used. For polymerization reactions that are sensitive to oxygen and/or moisture, the fill and seal can be conducted under an inert atmosphere.

The sealed temporary containers are placed in an environment that can be used to control the reaction temperature. Depending on the initiator used, heat may be required to generate the radicals that are required to initiate the polymerization. After the reaction is initiated, heat generated during the reaction may need to be removed from the temporary container. The environment can be an inert environment. Advantageously, the container material can be selected and constructed to be an excellent oxygen and/or moisture barrier such that oxygen and/or water do not diffuse into the temporary containers while the unsaturated monomer components are polymerized therein. Thus the environment does not necessarily have to be an inert environment, and oxygen and/or moisture can be present around the sealed temporary container during the polymerization reaction.

The environment can be a liquid bath comprising a heat transfer fluid. Heat transfer fluids can include water, a hydrocarbon such as an aromatic solvent, an alcohol, a glycol, silicon oil, or a combination comprising at least one of the foregoing. Exemplary heat transfer fluids include toluene, xylene, propanol, octanol, glycol such as hexylene glycol and ethylene glycol, silicone oil, isoparaffinic hydrocarbons such as ISOPAR™ fluids available from ExxonMobil, other synthetic hydrocarbons such as THERMINOL™ D-12 heat transfer fluid and THERMINOL™ VLT heat transfer fluid available from EASTMAN, or a combination comprising at least one of the foregoing. Optionally the liquid bath is agitated or circulated to improve heat transfer.

Alternatively or in addition, the environment can include circulated gas such as circulated air, nitrogen, carbon dioxide, argon, and the like to improve heat transfer at −100° C. to 200° C., preferably, at −40° C. to 150° C.

Heat and/or electromagnetic energy can be used to initiate and control the radical polymerization process in sealed temporary containers. As used herein, electromagnetic energy includes light of a certain wavelength (visible, infrared light, ultra-violet light), magnetic wave (microwave), radiation, or a combination thereof.

The sealed temporary containers can be placed in a liquid bath or a circulated gas environment at −100° C. to 200° C. for 0.001 to 200 hours to allow the monomers to polymerize. Preferably the sealed temporary containers are placed in an environment at about −40° C. to about 150° C. for about 10 minutes to about 24 hours.

After the monomers inside the temporary containers reach a certain conversion percent and/or the polymerization product reaches a certain conversion or a certain molecular weight, the radical polymerization reaction can be terminated. In an embodiment, greater than about 70 wt % or greater than about 80 wt % of the monomers are polymerized. The desired weight average molecular weight of the polymerized product depends on the applications of the polymerized products, ranging from above 1,000 Daltons, for example, from about 1,000 to 50,000,000 Daltons, preferably ranging from 5,000 to 30,000,000 Daltons.

Depending on the applications of the, polymerized products and the property difference between the container materials and the polymerized products, it may or may not necessary to remove the container materials after the polymerization stops.

If needed, the temporary containers can be either fully or partially removed by at least dissolving the container material in a solvent. Advantageously, the polymer product is a solid or gel, and the solvent only selectively dissolves the container material but not the polymer product, therefore, the solvent with the dissolved container material can be separated from the polymer product. Suitable solvents can be polar solvents, nonpolar solvents, or a combination comprising at least one of the foregoing. Exemplary polar solvents include water, methanol, propanol, hexanol, octanol, hexylene glycol, dichloromethane (DCM), tetrahydrofuran (THF), ethyl acetate, acetone, dimethylformamide (DMF), acetonitrile (MeCN), dimethyl sulfoxide (DMSO), nitromethane, propylene carbonate, ammonia, formic acid, acetic acid, or a combination comprising at least one of the foregoing. Water can be in the form of steam. Exemplary nonpolar solvents include hexane, toluene, xylene, gasoline, diesel, crude oil, oil from plants such as palm oil and vegetable oil, or a combination comprising at least one of the foregoing.

Optionally the container material is dissolved in the presence of an acid or base catalyst. Exemplary acid catalysts include acetic acid, formic acid, p-toluene sulfonic acid, carbonic acid, $CO_2$, HCl, $H_2SO_4$, $H_3PO_4$, or a combination comprising at least one of the foregoing. Exemplary base catalysts include NaOH, KOH, $Na_2CO_3$, $K_wCO_3$, ammonia, $NaHCO_3$, $KHCO_3$, or a combination comprising at least one of the foregoing. When an acid or base catalyst is used, the container material may be dissolved in a much faster rate. If desired, a rinse process with alcohols such as methanol, propanol, hexanol, octanol, hexylene glycol, and/or water or a neutralization process can be used to remove the residual acid/base catalysts after the container material is dissolved. Any neutralization process known to a person skilled in the art can be used. For example, one can use an acid to neutralize a base and use a base to neutralize an acid.

The temperature of the solvent used to dissolve the container material is not particularly limited and can be about −100° C. to about 200° C. or about 20° C. to about 100° C.

After the polymerization process, the polymer products can be dissolved in solvents, ground into particles, or pelletized for storage, transportation, and applications.

For some polymer products and their applications, it is preferred to dissolve the polymer product in a solvent. Exemplary solvents can be polar solvents, nonpolar solvents, or a combination comprising at least one of the foregoing. Exemplary polar solvents include water, methanol, propanol, hexanol, octanol, hexylene glycol, dichloromethane (DCM), tetrahydrofuran (THF), ethyl acetate, acetone, dimethylformamide (DMF), acetonitrile (MeCN), dimethyl sulfoxide (DMSO), nitromethane, propylene carbonate, ammonia, formic acid, acetic acid, or a combination comprising at least one of the foregoing. Water can be in the form of steam. Exemplary nonpolar solvents include hexane, toluene, xylene, gasoline, diesel, crude oil, oil from plants such as palm oil and vegetable, or a combination comprising at least one of the foregoing.

Grinding is a widely used method to reduce the polymer product size and makes it easier to store, transport, and apply polymer products. Grinding can be conducted under cryogenic grinding conditions or non-cryogenic grinding conditions. Pelletizing is another well-known and widely used process for the size reduction of polymer products.

Before or during the grinding and pelletizing, the initiators and catalysts may be removed or deactivated by washing with solvents, react with air, oxygen, and water.

Examples

Example 1. A temporary container of two inches long and two inches wide was made by heat sealing one piece of polyvinyl alcohol (PVA) film having a thickness of 75 microns. Liquid octadecyl acrylate (7.5 g) at 40° C. and 2,2′-azobis(2-methylpropionitrile) (40 mg) were added into the PVA temporary container. The temporary container was sealed with a heat sealer; then shaken by hand ten times and immersed in a silicone oil bath at 65° C. for 16 hours. Next, the temporary container was removed from the oil bath and cooled to room temperature. The temporary container was cut open and small amount of solid polymer was taken for the gel permeation chromatography analysis (GPC). The molecular weight was beyond the upper limit of GPC. The container material can be dissolved in water at 35° C. to 55° C.

Example 2. A temporary container of three inches long and two inches wide was made by heat sealing one piece of polyvinyl alcohol (PVA) film having a thickness of 75 microns. Liquid octadecyl acrylate (8.0 g) at 40° C., 2-mercaptoethanol (0.01 g), and 2,2′-azobis(2-methylpropionitrile) (40 mg) were added into the PVA temporary container. The temporary container was sealed with a heat sealer; then shaken by hand ten times and immersed in a silicone oil bath at 65° C. for 16 hours. Next, the temporary container was removed from the oil bath and cooled to room temperature. The temporary container was cut open and small amount of solid polymer was taken for the gel permeation chromatography analysis (GPC): $M_w$=102,400 Da; $M_n$=38,400 Da; $M_w/M_n$=2.67; monomer conversion=93%.

Example 3. A temporary container of three inches long and two inches wide was made from a piece of PVA film having a thickness of 75 microns. First, a polymer solution was prepared in the glass bottle: 19.2 g of octadecyl acrylate, 153 mg of ethyl α-bromoisobutyrate, 1 mg of copper(II) bromide, 17 mg of tris(2-pyridylmethyl)amine, 1 ml of dimethylformamide and 8 ml of anisole. Next, 10 ml of the polymer solution from the glass bottle was transferred to the PVA temporary container. Next, 40 mg of tin(II) 2-ethylhexanoate was added to the temporary container and temporary container was sealed with a heat sealer. The temporary container was then shaken by hand ten times and placed in the oven at 70° C. for 5 hours. Next, the temporary container was removed from oven and cooled to room temperature. The temporary container was cut open and small amount of solid polymer was taken for the gel permeation chromatography analysis (GPC): $M_w$=24,800 Da; $M_n$=16,700 Da; $M_w/M_n$=1.49; monomer conversion=92% ($M_{n,\ theoretical}$=22,500 Da).

Set forth below are various embodiments of the disclosure.

Embodiment 1. A process of manufacturing a polymer product, the process comprising: continuously forming a temporary container; introducing an unsaturated monomer component and a radical polymerization component into the temporary container; sealing the temporary container to form a sealed temporary container; and allowing the unsaturated monomer component to polymerize in the sealed temporary container to form the polymer product via a radical polymerization reaction.

Embodiment 2. The process as in any prior embodiment, wherein the sealed temporary container has a volume of about 1 milliliter to about 10 liters.

Embodiment 3. The process as in any prior embodiment, wherein the sealed temporary container has a wall thickness of about 1 micron to about 2,000 microns.

Embodiment 4. The process as in any prior embodiment, wherein the temporary container is formed from a container material comprising a polyethylene, a polypropylene, an ethylene propylene copolymer, a polystyrene, a polylactic acid, a polyamide, a polyester, a polystyrene, an ethylene vinyl acetate copolymer, an ethylene vinyl alcohol copolymer, a polyvinylpyrrolidone, an ethylene vinylpyrrolidone copolymer, a vinylpyrrolidone vinyl acetate copolymer, a polyvinyl acetate, a polyvinyl alcohol, a polyethylene oxide, a polyethylene glycol, polyvinylidene chloride, a polysaccharide or its derivative, or a combination comprising at least one of the foregoing.

Embodiment 5. The process as in any prior embodiment, comprising continuously forming the temporary container from a sheet of a container material.

Embodiment 6. The process as in any prior embodiment, wherein the temporary container has two or more layers.

Embodiment 7. The process as in any prior embodiment, wherein the temporary container has an inner surface and an opposing outer surface, and a coating is disposed on at least one of the inner and outer surfaces of the temporary container, the coating comprising a wax, a silicone, or a combination comprising at least one of the foregoing.

Embodiment 8. The process as in any prior embodiment, further comprising initializing the radical polymerization reaction by generating a radical.

Embodiment 9. The process as in any prior embodiment, wherein the radical polymerization reaction is initiated by heat, electromagnetic energy, or a combination comprising at least one of the foregoing.

Embodiment 10. The process as in any prior embodiment, further comprising placing the sealed temporary container in a heat transfer fluid or a circulated gas environment at −100° C. to 200° C. for about 0.001 hour to about 200 hours to allow the unsaturated monomer component to polymerize in the sealed temporary container forming the polymer product.

Embodiment 11. The process as in any prior embodiment, wherein the radical polymerization reaction is an atom transfer radical polymerization; and the radical polymerization component comprises an atom transfer radical polymerization initiator, and an optional component comprising a metal catalyst, a ligand, a photocatalyst, a reducing agent, a solvent, or a combination comprising at least one of the foregoing.

Embodiment 12. The process as in any prior embodiment, wherein the radical polymerization reaction is a reversible addition fragmentation chain transfer (RAFT) polymerization; and the radical polymerization component comprises a RAFT initiator, a RAFT agent, and optionally a solvent.

Embodiment 13. The process as in any prior embodiment, wherein the radical polymerization is a nitroxide mediated polymerization; and the radical polymerization component comprises a nitroxide, a nitroxide mediated polymerization initiator, and optionally a solvent.

Embodiment 14. The process as in any prior embodiment, wherein the radical polymerization is a free-radical polymerization, the radical polymerization component comprises a free-radical initiator, and an optional component comprising a solvent, a chain transfer agent, or a combination thereof; and the process comprises initiating the polymerization reaction via heat or electromagnetic energy.

Embodiment 15. The process as in any prior embodiment further comprising at least partially removing the temporary container.

Embodiment 16. The process as in any prior embodiment, wherein the temporary container is removed by dissolving the temporary container with a solvent comprising methanol, propanol, hexanol, octanol, hexylene glycol, water, dichloromethane (DCM), tetrahydrofuran (THF), ethyl acetate, acetone, dimethylformamide (DMF), acetonitrile (MeCN), dimethyl sulfoxide (DMSO), nitromethane, propylene carbonate, ammonia, formic acid, acetic acid, or a combination comprising at least one of the foregoing.

Embodiment 17. The process as in any prior embodiment, wherein the container material is dissolved in the presence of an acid or a base.

Embodiment 18. The process as in any prior embodiment, further comprising grinding the polymer product to produce a particulate polymer.

Embodiment 19. The process as in any prior embodiment comprising: continuously forming the temporary container; introducing the unsaturated monomer component and the radical polymerization component; sealing the temporary container to form a sealed temporary container; placing the sealed temporary container in a heat transfer fluid or a circulated gas environment at −100 to 200° C. for about 0.001 to about 200 hours or about 0.1 to about 200 hours; initiating the radical polymerization reaction; allowing the unsaturated monomer component to polymerize in the sealed temporary container forming the polymer product; removing the sealed temporary container from the heat transfer fluid or the circulated gas environment; and grinding, pelletizing, or dissolving the polymer product.

Embodiment 20. The process as in any prior embodiment further comprising at least partially removing the temporary container after the polymerization product is formed.

Embodiment 21. The process as in any prior embodiment, wherein the radical polymerization reaction is a free-radical polymerization reaction or a controlled radical polymerization reaction.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

What is claimed is:

1. A process of manufacturing a polymer product, the process characterized by:
   continuously forming a temporary container;
   introducing an unsaturated monomer component and a radical polymerization component into the temporary container;
   sealing the temporary container to form a sealed temporary container; and
   allowing the unsaturated monomer component to polymerize in the sealed temporary container to form the polymer product via a radical polymerization reaction wherein the temporary container has two or more layers or the temporary container has an inner surface and an opposing outer surface, and a coating is disposed on at least one of the inner and outer surfaces of the temporary container, the coating comprising a wax, a silicone, or a combination comprising at least one of the foregoing.

2. The process of claim 1, wherein the sealed temporary container has a volume of about 1 milliliter to about 10 liters.

3. The process of claim 1, wherein the sealed temporary container has a wall thickness of about 1 micron to about 2,000 microns.

4. The process of claim 1, wherein the temporary container is formed from a container material comprising a polyethylene, a polypropylene, an ethylene propylene copolymer, a polystyrene, a polylactic acid, a polyamide, a polyester, a polystyrene, an ethylene vinyl acetate copolymer, an ethylene vinyl alcohol copolymer, a polyvinylpyrrolidone, an ethylene vinylpyrrolidone copolymer, a vinylpyrrolidone vinyl acetate copolymer, a polyvinyl acetate, a polyvinyl alcohol, a polyethylene oxide, a polyethylene glycol, polyvinylidene chloride, a polysaccharide or its derivative, or a combination comprising at least one of the foregoing.

5. The process of claim 1, wherein the radical polymerization reaction is initiated by heat, electromagnetic energy, or a combination comprising at least one of the foregoing.

6. The process of claim 1, further characterized by placing the sealed temporary container in a heat transfer fluid or a circulated gas environment at −100° C. to 200° C. for about 0.001 hour to about 200 hours to allow the unsaturated monomer component to polymerize in the sealed temporary container forming the polymer product.

7. The process of claim 1, wherein
   the radical polymerization reaction is an atom transfer radical polymerization; and
   the radical polymerization component comprises an atom transfer radical polymerization initiator, and an optional component comprising a metal catalyst, a ligand, a photocatalyst, a reducing agent, a solvent, or a combination comprising at least one of the foregoing.

8. The process of claim 1, wherein the radical polymerization reaction is a reversible addition fragmentation chain transfer (RAFT) polymerization; and the radical polymerization component comprises a RAFT initiator, a RAFT agent, and optionally a solvent.

9. The process of claim 1, wherein the radical polymerization is a nitroxide mediated polymerization; and the radical polymerization component comprises a nitroxide, a nitroxide mediated polymerization initiator, and optionally a solvent.

10. The process of claim 1, wherein the radical polymerization is a free-radical polymerization, the radical polymerization component comprises a free-radical initiator, and an optional component comprising a solvent, a chain transfer agent, or a combination thereof; and the process comprises initiating the polymerization reaction via heat or electromagnetic energy.

11. The process of claim 1, wherein the temporary container is at least partially removed by dissolving the temporary container with a solvent comprising methanol, propanol, hexanol, octanol, hexylene glycol, water, dichloromethane (DCM), tetrahydrofuran (THF), ethyl acetate, acetone, dimethylformamide (DMF), acetonitrile (MeCN), dimethyl sulfoxide (DMSO), nitromethane, propylene carbonate, ammonia, formic acid, acetic acid, or a combination comprising at least one of the foregoing.

12. The process of claim 11, wherein the container material is dissolved in the presence of an acid catalyst or a base catalyst.

13. The process of claim 1, further characterized by grinding the polymer product to produce a particulate polymer.

14. The process of claim 1 comprising:
continuously forming the temporary container;
introducing the unsaturated monomer component and the radical polymerization component;
sealing the temporary container to form a sealed temporary container;
placing the sealed temporary container in a heat transfer fluid or a circulated gas environment at −100 to 200° C. for about 0.001 to about 200 hours;
initializing the radical polymerization reaction;
allowing the unsaturated monomer component to polymerize in the sealed temporary container forming the polymer product;
removing the sealed temporary container from the heat transfer fluid or the circulated gas environment; and
grinding, pelletizing, or dissolving the polymer product.

* * * * *